(12) United States Patent
Pashintsev et al.

(10) Patent No.: US 9,503,612 B1
(45) Date of Patent: Nov. 22, 2016

(54) GLARE MITIGATION FOR DYNAMIC DOCUMENT SCANNING

(71) Applicant: Evernote Corporation, Redwood City, CA (US)

(72) Inventors: Alexander Pashintsev, Cupertino, CA (US); Boris Gorbatov, Sunnyvale, CA (US)

(73) Assignee: Evernote Corporation, Redwood City, CA (US)

( * ) Notice: Subject to any disclaimer, the term of this patent is extended or adjusted under 35 U.S.C. 154(b) by 0 days.

(21) Appl. No.: 14/881,617

(22) Filed: Oct. 13, 2015

Related U.S. Application Data

(60) Provisional application No. 62/066,079, filed on Oct. 20, 2014.

(51) Int. Cl.
*H04N 1/04* (2006.01)
*H04N 1/409* (2006.01)
*H04N 1/00* (2006.01)
*H04N 1/401* (2006.01)

(52) U.S. Cl.
CPC .......... *H04N 1/4097* (2013.01); *H04N 1/0049* (2013.01); *H04N 1/00814* (2013.01); *H04N 1/00835* (2013.01); *H04N 1/401* (2013.01); *H04N 2201/0084* (2013.01); *H04N 2201/0096* (2013.01)

(58) Field of Classification Search
CPC ........ G06K 9/40; G06K 9/44; G06K 9/4652; G06K 9/6202; G06K 9/6255; G06K 9/66; G06K 9/80; F21K 9/56; F21K 9/54; F21K 9/58; F21S 10/02; F21V 14/003; F21V 14/08; F21V 17/02; F21V 23/0457

USPC ....... 358/1.9, 2.1, 1.15, 3.23, 406, 504, 520; 382/167, 103, 166, 128, 165, 190, 100, 382/106, 115, 162, 164, 233, 248, 274; 348/E5.031, E7.085, E9.037, 222.1, 348/453, 77, E13.075, E17.001, E17.002, 348/E7.003, E7.091, E9.051, E9.053, 143, 348/187, 189, 220.1, 221.1, 223.1, 224.1
See application file for complete search history.

(56) References Cited

U.S. PATENT DOCUMENTS

| | | | | |
|---|---|---|---|---|
| 5,313,527 | A * | 5/1994 | Guberman | G06K 9/00859 382/186 |
| 5,818,528 | A * | 10/1998 | Roth | G06K 7/10732 235/455 |
| 9,223,417 | B1 * | 12/2015 | Polyakov | G06K 9/222 |
| 9,235,768 | B1 * | 1/2016 | Pashintsev | G06K 9/00852 |
| 2005/0248660 | A1 * | 11/2005 | Stavely | G03B 39/00 348/208.16 |

(Continued)

*Primary Examiner* — Negussie Worku
(74) *Attorney, Agent, or Firm* — Muirhead and Saturnelli, LLC

(57) ABSTRACT

Mitigating glare in connection with photographing a document using a camera includes assessing a first amount of glare that would result if a user were to take a snapshot at a first camera position and lighting conditions, if the first amount of glare is below a predetermined threshold, taking a snapshot with the camera, and, if the first amount of glare is above the predetermined threshold, continuously prompting the user to adjust a position of the camera and taking the snapshot when the camera is in a second position and a second amount of glare, different from the first amount of glare, is below the predetermined threshold. The lighting conditions may include effects of external lighting sources. The user may adjust the external lighting sources before taking the snapshot. The lighting conditions may include effects of an internal light source of the camera.

26 Claims, 5 Drawing Sheets

(56) References Cited

U.S. PATENT DOCUMENTS

| | | | | |
|---|---|---|---|---|
| 2007/0258007 A1* | 11/2007 | Justiss | H04N 5/2351 | 348/364 |
| 2010/0009700 A1* | 1/2010 | Camp, Jr. | H04M 1/72572 | 455/456.6 |
| 2013/0195315 A1* | 8/2013 | Baheti | G06K 9/00456 | 382/103 |
| 2013/0260727 A1* | 10/2013 | Knudson | G06Q 30/00 | 455/414.1 |
| 2013/0271796 A1* | 10/2013 | Landa | H04N 1/387 | 358/463 |
| 2014/0050398 A1* | 2/2014 | Pashintsev | G06K 9/6202 | 382/167 |
| 2014/0357312 A1* | 12/2014 | Davis | G10L 25/48 | 455/550.1 |
| 2014/0375862 A1* | 12/2014 | Kim | H04N 5/23245 | 348/333.02 |
| 2015/0163345 A1* | 6/2015 | Cornaby | G06F 3/04847 | 345/633 |
| 2015/0286873 A1* | 10/2015 | Davis | G06F 3/00 | 382/103 |
| 2015/0373806 A1* | 12/2015 | Vissenberg | H05B 33/0872 | 315/151 |

* cited by examiner

GLARE MITIGATION FOR DYNAMIC DOCUMENT SCANNING

CROSS-REFERENCE TO RELATED APPLICATIONS

This application claims priority to U.S. Prov. App. No. 62/066,079, filed on Oct. 20, 2014, and entitled "GLARE MITIGATION FOR DYNAMIC DOCUMENT SCANNING", which is incorporated herein by reference.

TECHNICAL FIELD

This application is directed to the field of capturing, analyzing and managing information, and more particularly to the field of capturing, analyzing and managing information in connection with obtaining and processing photographic images.

BACKGROUND OF THE INVENTION

Modern lifestyle is undergoing fundamental changes due to a quick emergence of a mobile computing paradigm. According to market statistics and forecasts, smartphones and tablets outsold personal computers for the first time in the fourth quarter of 2011. In the fourth quarter of 2014, unit shipment volumes of tablets alone have exceeded cumulative personal and business PC shipments. Some analytic reports predict that by 2016 there will be over ten billion Internet-connected mobile devices in the hands of end users, of which approximately eight billion will be smartphones and tablets; and by 2017, about 87% of the market share of smart connected devices is expected to belong to smartphones and tablets compared with 13% for desktop and mobile PCs.

In response to growing volumes and expanding feature sets of smartphones and tablets, a new generation of mobile software applications has emerged. These software applications utilize enhanced connectivity of mobile devices and take advantage of content capturing capabilities enabled by embedded cameras, microphones, handwritten input in mobile devices; the applications also make use of device motion sensors, multi-touch screens, etc.

One of the smartphone application categories is related to use of phone cameras. According to industry statistics, well over 80% of mobile phones and nearly all smartphones are shipping with a quality camera, stimulating a quick growth of mobile scanning applications, which are already used by hundreds of millions people worldwide. This new content capturing paradigm increasingly includes taking, storing and processing photographs of paper documents. According to recent market surveys, a smartphone or a tablet camera for document capture combined with cloud file services for document storage and retrieval are used by more smartphone and tablet users than earlier solutions with mobile scanners and mobile printing services.

Online services and multi-platform software such as the Evernote service and platform by the Evernote Corporation of Redwood City, Calif., ABBYY by the ABBYY Group of Companies, the Dropbox service by Dropbox, Inc., and many other solutions offer image storing and advanced processing, as well as keyword and other types of searching within images of photographed documents.

Notwithstanding significant advances in smartphone camera quality, processing power of mobile devices, and increased capabilities and features of online services, including extensive document and image processing features, the process of high quality scanning of documents using smartphone and tablet cameras still faces significant challenges. Obtaining quality images of typed, handwritten and combined pages using a camera phone may present a difficult task for a variety of reasons; thus, photographs of handwritten and printed pages may be subject to variable lighting conditions, to perspective distortion and to background effects depending on the surface a document may be residing on; pages may be bent toward notebook edges or a dividing line creating an arc-shaped page, etc.

Techniques for correcting real-life photo images with shadows, reflections and various types of distortions have been explored by many vendors with varying degrees of success. One of the most challenging tasks of image capturing via mobile cameras is glare mitigation. In contrast with conventional paper scanners that provide stable and optimal lighting conditions for captured documents, the scanning process for paper documents with phone cameras may be subject to variable lighting conditions, as well as to adaptation requirements related to different types of paper, texturing of page surface, specific parameters of printed or handwritten text and drawings, including reflective characteristics of ink and typographic paint, etc.

In particular, the presence of external sources of light, as well as usage of a smartphone's own light source, independently or in combination with a camera flash, may cause persistent and stable or temporary and random reflections from the paper surface and may create one or multiple glare spots on a captured image of a paper document. Subsequently, portions of typed or handwritten content of the document (text, charts, drawings, etc.) may be obstructed on a captured image, preventing the digital content from viewing, editing, search and other types of processing.

Accordingly, it is desirable to provide glare mitigation in connection with capturing photographs of paper and other conventional documents using smartphone cameras.

SUMMARY OF THE INVENTION

According to the system described herein, mitigating glare in connection with photographing a document using a camera includes assessing a first amount of glare that would result if a user were to take a snapshot at a first camera position and lighting conditions, if the first amount of glare is below a predetermined threshold, taking a snapshot with the camera, and, if the first amount of glare is above the predetermined threshold, continuously prompting the user to adjust a position of the camera and taking the snapshot when the camera is in a second position and a second amount of glare, different from the first amount of glare, is below the predetermined threshold. The lighting conditions may include effects of external lighting sources. The user may adjust the external lighting sources before taking the snapshot. The lighting conditions may include effects of an internal light source of the camera. Mitigating glare in connection with photographing a document using a camera may also include actuating the internal light source prior to taking the snapshot and including effects of the internal light source in connection with assessing the first amount of glare and the second amount of glare. The internal light source may be used in connection with a flash for the camera. Prompting the user may include providing an image to the user indicating a preview of the snapshot that includes indications of glare spots. The preview may indicate effects on the glare spots as the user adjusts the position of the camera. Assessing glare may include using a camera preview mode to provide a video image that continuously shows snapshots that would be taken by the camera. The snapshot may be taken automatically when the amount of glare is below the predetermined threshold. In response to adjusting the position of the camera failing to lower the amount of glare below the predetermined threshold, the user may be prompted to move the document. Mitigating glare in connection with photographing a document using a camera may also include taking the snapshot in response to the amount of glare being above the predetermined threshold and the location of the glare corresponding to portions of the document containing relatively less content than other portions of the document. The camera may be provided in a smartphone.

According further to the system described herein, a non-transitory computer-readable medium contains software that mitigates glare in connection with photographing a document using a camera. The software includes executable code that assesses a first amount of glare that would result if a user were to take a snapshot at a first camera position and lighting conditions, executable code that takes a snapshot with the camera if the first amount of glare is below a predetermined threshold, and executable code that, if the first amount of glare is above the predetermined threshold, continuously prompts the user to adjust a position of the camera and takes the snapshot when the camera is in a second position and a second amount of glare, different from the first amount of glare, is below the predetermined threshold. The lighting conditions may include effects of external lighting sources. The user may adjust the external lighting sources before taking the snapshot. The lighting conditions may include effects of an internal light source of the camera. The software may include executable code that actuates the internal light source prior to taking the snapshot and executable code that includes effects of the internal light source in connection with assessing the first amount of glare and the second amount of glare. The internal light source may be used in connection with a flash for the camera. Executable code that prompts the user may provide an image to the user indicating a preview of the snapshot that includes indications of glare spots. The preview may indicate effects on the glare spots as the user adjusts the position of the camera. Executable code that assesses glare may use a camera preview mode to provide a video image that continuously shows snapshots that would be taken by the camera. The snapshot may be taken automatically when the amount of glare is below the predetermined threshold. In response to adjusting the position of the camera failing to lower the amount of glare below the predetermined threshold, the user may be prompted to move the document. The software may also include executable code that takes the snapshot in response to the amount of glare being above the predetermined threshold and the location of the glare corresponding to portions of the document containing relatively less content than other portions of the document. The camera may be provided in a smartphone.

The proposed system provides support for dynamic scanning of document pages with user and system controlled glair mitigation. The system employs a continuous video stream captured by a phone camera in a preview mode to detect potential glare spots on a document image, assess potential damage of such spots for the image quality and direct a user to change a camera view angle (and possibly a document position on a desk or other plane) to avoid capturing, by the phone camera, reflections from the document surface that cause glare. After the glare is eliminated from the image through user controlled re-positioning and rotation of the camera phone and possibly through relocation of the document or switching off external light sources, the software may direct the camera to automatically take a shot of the document page without user intervention.

At the start of a document capturing session, the document is positioned on a plane surface and the user points a smartphone camera toward a current document page so that the page appears in a preview window on the smartphone screen. The system may then continuously capture the preview video stream, made available to software application developers for some smartphone cameras, and may dynamically assess the quality of an intended image of the document page.

In particular, the system may identify one or multiple glare spots where an excessive brightness of a document area or of a set of pixels on the document image may cause partial or complete darkening out (whitening out in case of an inverted image) of a portion of the document content, which would render such an area unreadable and may prevent processing of the area on the page image.

There may be multiple reasons for glare spots to appear on a document surface;

additionally, such spots may have multiple types of appearance depending on lighting conditions and physical parameters of the paper and the printing/writing substance, such as typographic paint or ink. Examples may include:

One or multiple external light sources may cause light to be reflected from the document surface and the corresponding reflection cone (or multiple cones) captured by the camera may determine size(s) of solid glare spot(s) on the image preview. Reflection parameters may depend on the paper type, such as glossy, normal, matte, etc.

An uneven page surface, including texture, bruises, crumpled paper and other surface abnormalities may create mini-mirrors on the document, causing small flares from internal or external light source(s) that may obstruct small portions of the document content, such as individual letters, parts of letters and drawings, etc.

A typographic ink, paint or a regular ink from a ballpoint pen or a fountain pen used to author handwritten content may reflect light, especially when the page surface is uneven, and may create small glare spots (similar to sparkles) which may damage images of individual symbols, groups of symbols or drawings on the full image.

Depending on the nature, size, density and location of glare spots detected on a preview image of a document page, the system may determine that taking a photo of the document under existing conditions and camera position may not result in a quality image. In such a case, the system may continue monitoring preview images for a short time after the determination has been made, comparing glare spots identified on a sequence of preview frames in order to ensure that an original determination holds.

In some embodiments, criteria for detecting unacceptable glare on a preview image may include clustering ultra-bright pixels and determining size of glare spots (areas) where density of such pixels exceeds a pre-defined threshold. Another set of criteria may further analyze a mutual disposition of glare spots and page content by identifying content-free and content-intensive pieces of a page outside the glare spots and by calculating a potential damage to the page content should the snapshot of the page be taken under the existing conditions. For example, if a glare spot is surrounded by a relatively large piece of empty, content-less portion of the page, then the system may ignore the glare spot if the glare spot is not too big, since the glare spot is unlikely to damage any page content inside the spot. On the other hand, if a glare spot is located in the middle of a page fragment densely filled with document content, then the system is unlikely to ignore the glare spot, unless specifically directed by the user.

After an unacceptable glare in the preview video stream of a document capturing session has been determined, the system may prepare a special display to the user on the smartphone screen showing a diagram with the disposition, size, shape and intensity of detected glare spots. At the same time, the system may direct the user to change a view angle of the document to avoid glare. The user may follow system recommendations and change a view angle and/or a position of the camera until the system finds the quality of the image satisfactory based on analysis of the preview video stream. As the user changes the view angle and position of the camera, the system may display the evolution of the glare spot(s) across the diagram on the smartphone screen. A satisfactory position does not necessarily need to be a position where glare spots are absent; if the content area of the page is free of glare spots and such spots are present only, for example, on page margins, it might be a good enough disposition to take the photograph of the page. Alternatively, the disposition of external light sources may be such that elimination of glare spots by rotating the camera may be difficult (for example, a document printed on a glossy paper is positioned directly under a strong external light source). Under such circumstances, the user may choose to switch off one or more of the external light sources or shift the document along the surface, if feasible.

After one or several attempts of changing the camera position and the view angle, the system may determine a document preview which is glare-free or has an acceptable quality, as explained elsewhere herein, and may instruct the user through on-screen instructions or otherwise to maintain the camera in the resulting position for an instant document snapshot. Then the camera may automatically take a snapshot of the page.

In case the camera flash light is used, the system may also use an internal light source of the smartphone camera for stable illumination of the document, in order to reduce additional risks or effects of obtaining new glare spots due to reflections of the camera flash light from the page surface. If the internal light source is used, then a stable illumination beam from the source may be directed to the document prior to taking the shot to ensure that the source does not create glare. If the source creates glare, the above process of camera repositioning could be repeated to mitigate glare from the internal light source of the smartphone camera.

Note that once a favorable position of the smartphone camera with respect to lighting conditions has been chosen, the system and the user may take advantage of the favorable positioning by scanning multiple document pages, whether the pages are a loose stack of paper, so that new pages are put on top of the stack or the scanned pages are removed, one at a time, as photographs are taken or whether the pages are a brochure (or similar) where the user may turn pages without significantly moving the document or the camera.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for dynamic glare mitigation, which combines assessing image quality utilizing a video stream of a smartphone camera with directing users to change camera position and view angle to eliminate potential glare spots.

Figure 1:
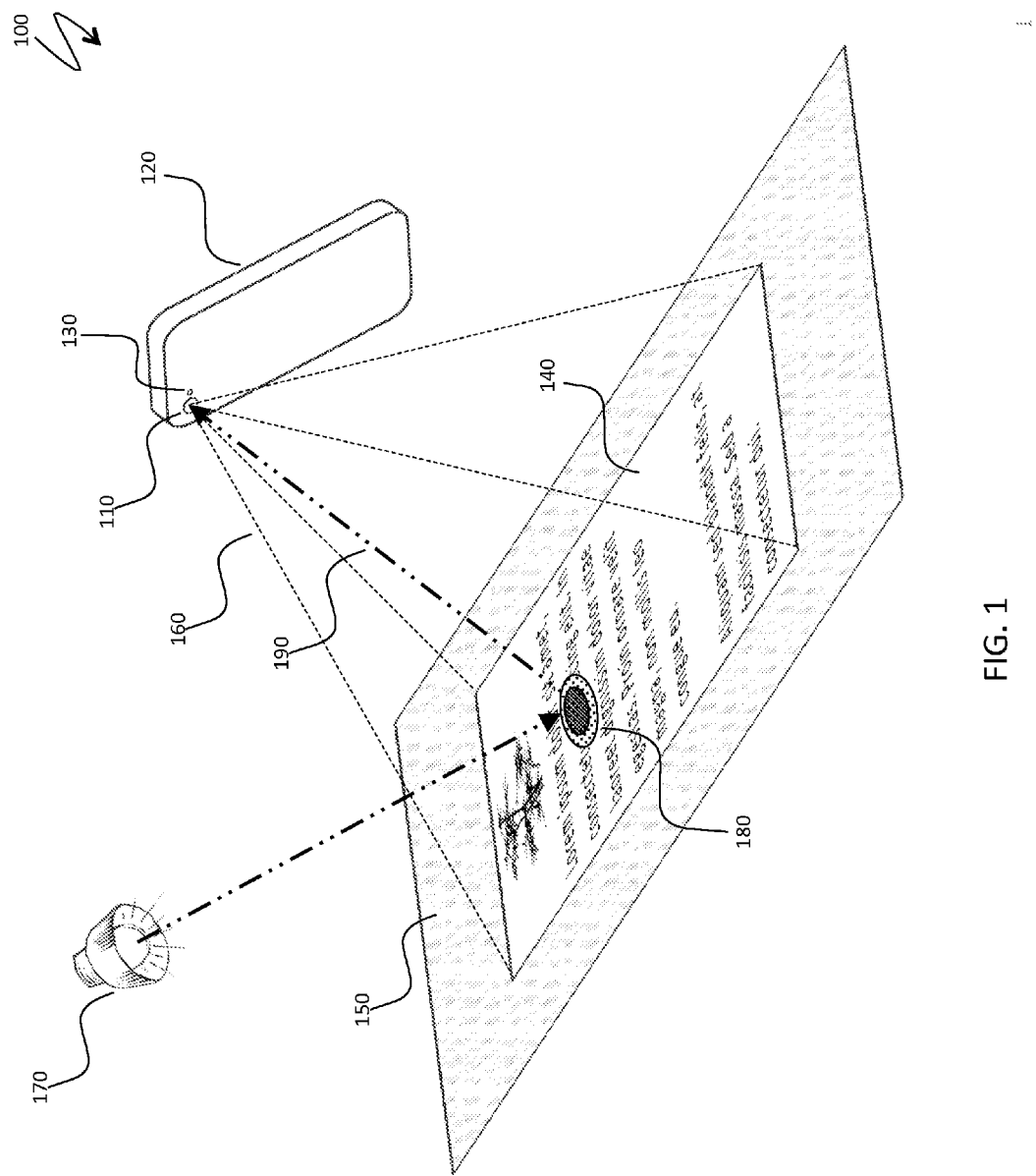
FIG. 1 is a schematic illustration of a singular sizable glare spot created by an external light source that may be handled according to an embodiment of the system described herein.

FIG. 1 is a schematic illustration 100 of a singular sizable glare spot created by an external light source 170. A camera 110 of a smartphone 120, which also has a flash with an internal light source 130, is pointed at a document page 140, arranged on a surface 150, so that the document page 140 fits a video frame of the camera 110, as shown by dashed lines 160. The external light source 170 is above the surface; the reflection of light emitted by the light source 170 creates a sizable glare spot 180 on the page 140 for a current disposition and view angle of the camera 110, as schematically shown by a dot-dashed light reflection line 190.

A static snapshot of the page 140 made by the camera 110 under conditions shown in FIG. 1 would have included the glare spot 180 on the photographed image of the page 140, which might have obstructed a portion of content of the page 140 and could diminish the quality of a camera scan of the page 140. However, the system described herein may identify the glare spot 180 in the camera preview mode and, after analyzing the size, disposition and effect of the spot 180 on captured content in a potential static snapshot, the system may display a schematic chart of the page 140 to the user and instruct the user to change position and view angle of the camera 110 to avoid image defects caused by the external light source 170, as explained elsewhere herein.

Figure 2:
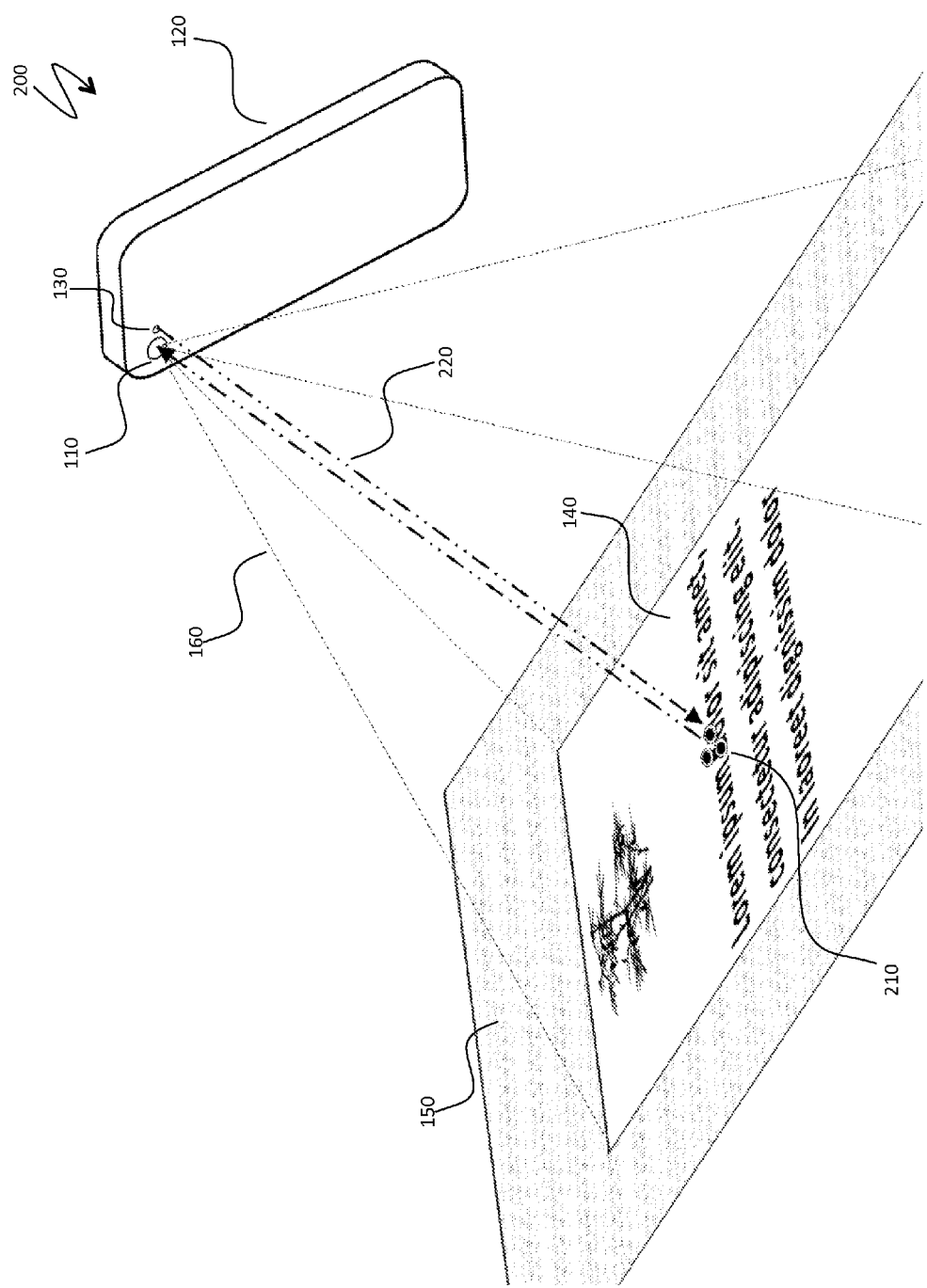
FIG. 2 is a schematic illustration of multiple small glare spots created by a reflecting font type when an internal light source of a phone camera is used that may be handled according to an embodiment of the system described herein.

FIG. 2 is a schematic illustration 200 of multiple small glare spots 210 created by a reflecting font type when an internal light source 130 of the phone camera 110 is used. The camera 110 of the smartphone 120 emits light from the internal light source 130 (similar to flash light applications on smartphones), illuminating the document page 140 arranged on the surface 150, where an entirety of the page 140 fits a frame of the camera 110, as shown by the dashed lines 160. A reflection of a beam from the internal light source 130 creates the glare spots 210, which are relatively small and sparkle-like and which reflect back into a lens of the camera 110, as shown by dot-dashed lines 220.

Figure 3:
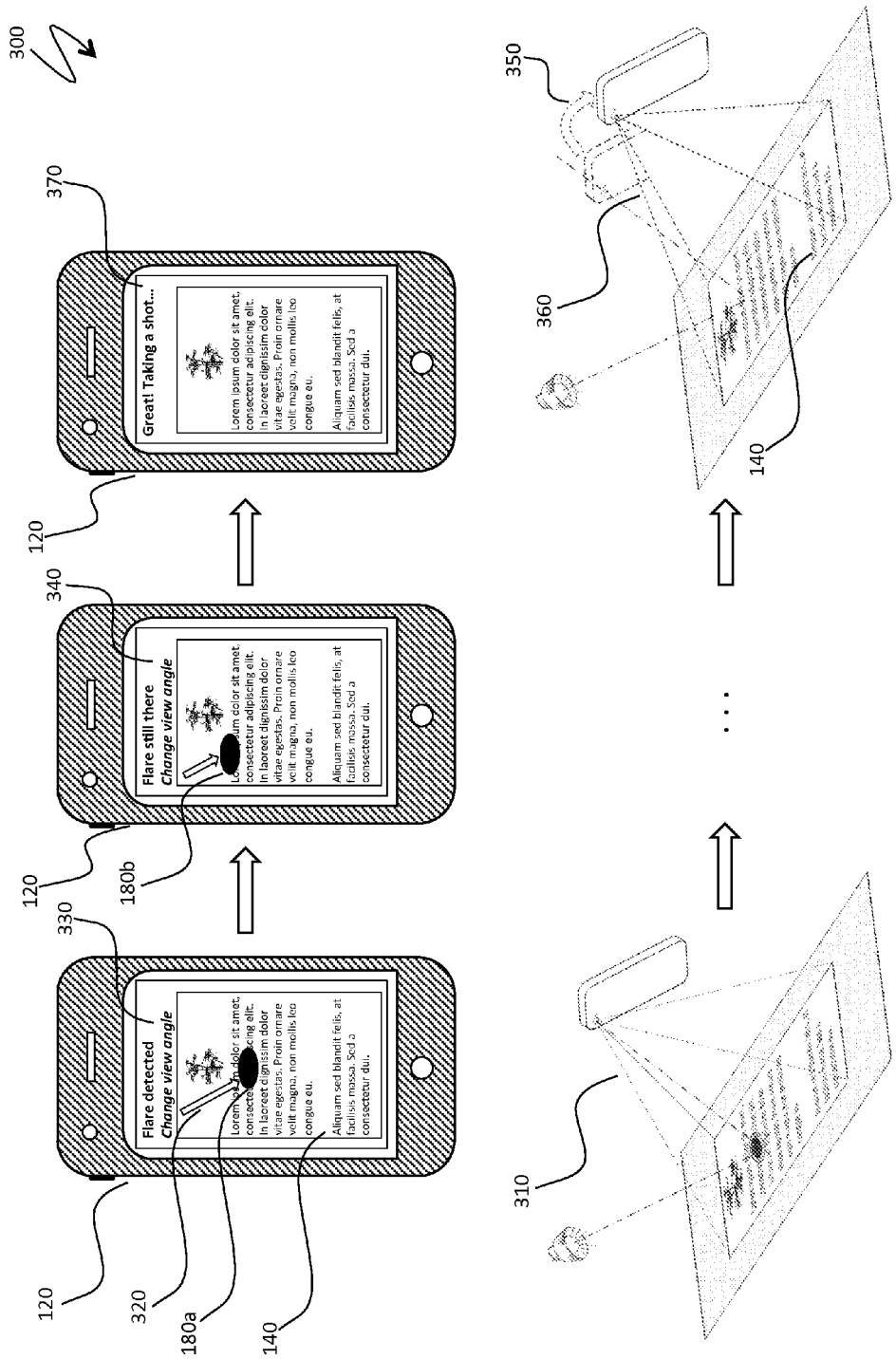
FIG. 3 is a schematic illustration of an interactive process of glare mitigation, according to an embodiment of the system described herein.

FIG. 3 is a schematic illustration 300 of an interactive process of glare mitigation. The system processes a preview video stream of the document page 140 corresponding to an original position and a view angle 310 of the camera phone 120. This leads to identifying a glare spot 180a, which may be shown on a depiction of the page 140 on the smartphone screen, together with an optional pointer 320 emphasizing the glare spot 180 and a location of the glare spot 180a on the page 140. A message 330 on a screen of the phone 120 may instruct the user to change a position and view angle of the camera 120 to mitigate glare. If the user has moved the camera 120 insufficiently, the glare spot 180b may shift to a different position corresponding to a new position and view angle of the camera 120. If the glare spot 180b is still obstructing a noticeable portion of content of the page 140, the system may provide a different on-screen message 340, instructing the user to continue changing position and view angle of the camera 120 in search of a glare-free snapshot. (Intermediate camera dispositions aren't illustrated in FIG. 3; the whole trajectory of camera movement is indicated by an arrow 350.)

Finally, the user may bring the camera 120 to a desired position 360 where an entirety of the page 140 fits into a view of the camera 120 and there are no glare spots on the image. After analyzing the scene, the system may decide to automatically take a static snapshot and may inform user about taking the snapshot with a message 370. The camera 120 may take the snapshot using a camera flash (not shown in FIG. 3), possibly combined with an additional illumination of the page 140 from an internal light source (not shown in FIG. 3). If the internal light source is used, the system may briefly emit a beam from the internal light source and re-process the video stream to make sure that there are no additional glare spots cause by the new lighting conditions.

Figure 4:
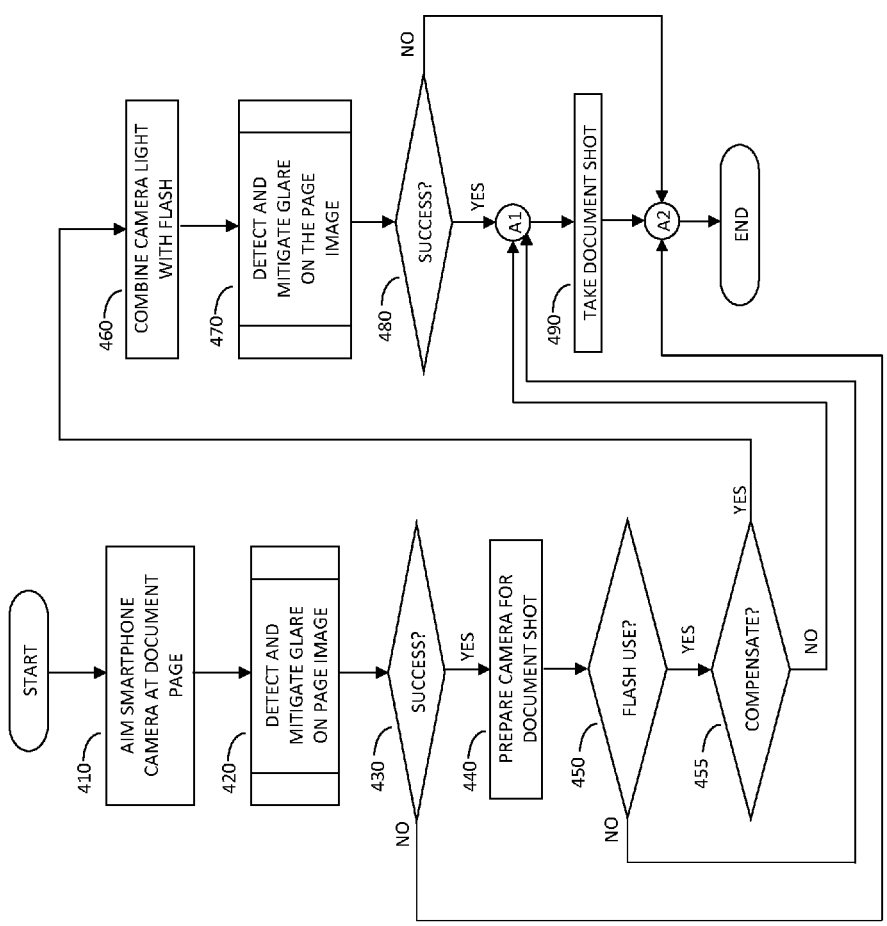
FIG. 4 is a system flow diagram illustrating processing in connection with dynamic scanning of document pages including glare mitigation, according to an embodiment of the system described herein.

Referring to FIG. 4, a general system flow diagram 400 illustrates processing in connection with dynamic scanning of document pages including glare mitigation. Processing begins at a step 410 where a user aims a smartphone camera at a document page. After the step 410, processing proceeds to a step 420 where the system detects and mitigates glare from external light sources, as explained in more detail elsewhere herein. After the step 420, processing proceeds to a test step 430 where it is determined whether glare detection and mitigation was a success (i.e. whether there was no significant glare obstructing the content or the system has successfully directed the user to change a camera position to eliminate harmful glare). If not, processing is complete; otherwise, processing proceeds to a step 440 where the system prepares the camera for a static document snapshot. After the step 440, processing proceeds to a test step 450 where it is determined whether use of a camera flash is intended. If so, processing proceeds to a test step 455 where it is determined whether the use of smartphone camera flash will be compensated with camera light from an internal smartphone light source. If so, processing proceeds to a step 460 where the camera light is combined with flash, as explained elsewhere herein. In some cases, for a short period of time, the internal camera light is illuminating the document page without the flash.

After the step 460, processing proceeds to a step 470 where the system detects and mitigates glare on the document page, potentially caused by the light from the internal source, as explained in more detail elsewhere herein. After the step 470, processing proceeds to a test step 480 where it is determined whether glare detection and mitigation in conjunction with the illumination of the page from the internal light source was a success (similar to processing provided with the step 430, explained above). If not, processing is complete; otherwise, processing proceeds to a step 490 where the system takes a static snapshot of the document page. Note that the step 490 can be independently reached from the test step 450 if it was determined that the camera flash is not used and from the test step 455 if it was determined that the flash use is not combined with emitting light from the internal light source. After the step 490, processing is complete.

Figure 5:
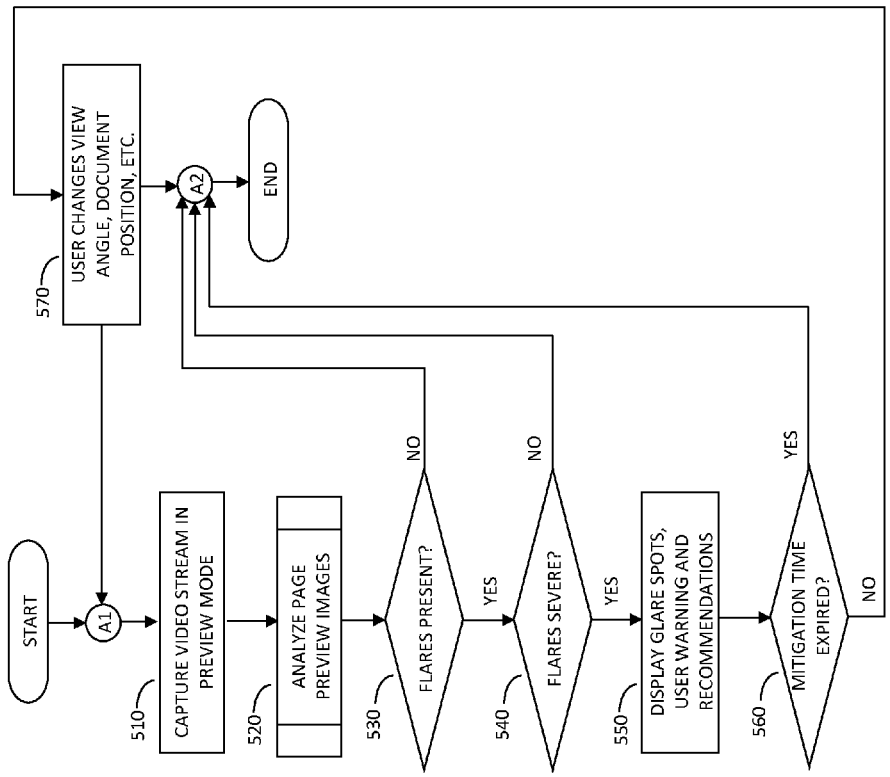
FIG. 5 is a system flow diagram illustrating processing in connection with system functioning at a glare mitigation phase, according to an embodiment of the system described herein.

Referring to FIG. 5, a system flow diagram 500 illustrates in more detail processing in connection with glare detection and mitigation at the steps 420 and 470 of FIG. 4, described above. Processing begins at a step 510 where the system captures a video stream from a document page in the smartphone's preview mode. After the step 510, processing proceeds to a step 520 where the system analyzes page preview images to detect and assess glare, as explained elsewhere herein. After the step 520, processing proceeds to a test step 530 where it is determined whether glare spots (flares) are present in the preview images. If not, processing is complete (glare mitigation is not required); otherwise, processing proceeds to a test step 540 where it is determined whether the detected glare spots are severe (for example, the glare spots obstruct a significant portion of content of the document page), as explained elsewhere herein. If not, processing is complete (glare mitigation is not required); otherwise, processing proceeds to a step 550 where the system displays on user's smartphone a schematic image of the page with glare spot(s), user warnings and recommendations aimed at glare mitigation, as explained elsewhere herein (see, for example, FIG. 3 and the accompanying text).

The user may accept system recommendations and start or continue changing camera position and view angle, moving documents along the surface, switching off external source lights when possible and feasible, etc. At the same time, if the user has spent enough time attempting to mitigate glare and has not succeeded, the user may interrupt the process and stop further attempts to eliminate glare under the existing environment. Accordingly, the system flow diagram proceeds as follows. After the step 550, processing proceeds to a test step 560 where it is determined whether a mitigation time period has expired. If so, processing is complete; otherwise, processing proceeds to a step 570 where the user changes camera view angle and position, document position, etc. After the step 570, processing proceeds back to the step 510, discussed above, to assess the effect of changed camera position and environment on the document capturing quality.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. A mobile device other than a smartphone may be used. Note that the system described herein may be used with any device capable of taking a photograph and providing appropriate feedback to a user, such as a digital camera with a screen for providing messages to the user and a mechanism for providing an intermediate image stream.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of mitigating glare in connection with photographing a document using a camera, comprising:
    assessing a first amount of glare that would result if a user were to take a snapshot at a first camera position and lighting conditions;
    if the first amount of glare is below a predetermined threshold, taking a snapshot with the camera; and
    if the first amount of glare is above the predetermined threshold, continuously prompting the user to adjust a position of the camera relative to a position of the document and taking the snapshot when the camera is in a second position and a second amount of glare, different from the first amount of glare, is below the predetermined threshold.

2. The method, according to claim 1, wherein the lighting conditions include effects of external lighting sources.

3. The method, according to claim 2, wherein the user adjusts the external lighting sources before taking the snapshot.

4. The method, according to claim 1, wherein the lighting conditions include effects of an internal light source of the camera.

5. The method, according to claim 4, further comprising:
    actuating the internal light source prior to taking the snapshot; and
    including effects of the internal light source in connection with assessing the first amount of glare and the second amount of glare.

6. The method, according to claim 5, wherein the internal light source is used in connection with a flash for the camera.

7. The method, according to claim 1, wherein prompting the user includes providing an image to the user indicating a preview of the snapshot that includes indications of glare spots.

8. The method, according to claim 7, wherein the preview indicates effects on the glare spots as the user adjusts the position of the camera.

9. The method, according to claim 1, wherein assessing glare includes using a camera preview mode to provide a video image that continuously shows snapshots that would be taken by the camera.

10. The method, according to claim 1, wherein the snapshot is taken automatically when the amount of glare is below the predetermined threshold.

11. The method, according to claim 1, wherein, in response to adjusting the position of the camera failing to lower the amount of glare below the predetermined threshold, the user is prompted to move the document.

12. The method, according to claim 1, further comprising:
    taking the snapshot in response to the amount of glare being above the predetermined threshold and the location of the glare corresponding to portions of the document containing relatively less content than other portions of the document.

13. The method, according to claim 1, wherein the camera is provided in a smartphone.

14. A non-transitory computer-readable medium containing software that mitigates glare in connection with photographing a document using a camera, the software comprising:
    executable code that assesses a first amount of glare that would result if a user were to take a snapshot at a first camera position and lighting conditions;
    executable code that takes a snapshot with the camera if the first amount of glare is below a predetermined threshold; and
    executable code that, if the first amount of glare is above the predetermined threshold, continuously prompts the user to adjust a position of the camera relative to a position of the document and takes the snapshot when the camera is in a second position and a second amount of glare, different from the first amount of glare, is below the predetermined threshold.

15. The non-transitory computer-readable medium, according to claim 14, wherein the lighting conditions include effects of external lighting sources.

16. The non-transitory computer-readable medium, according to claim 15, wherein the user adjusts the external lighting sources before taking the snapshot.

17. The non-transitory computer-readable medium, according to claim 14, wherein the lighting conditions include effects of an internal light source of the camera.

18. The non-transitory computer-readable medium, according to claim 17, further comprising:
    executable code that actuates the internal light source prior to taking the snapshot; and
    executable code that includes effects of the internal light source in connection with assessing the first amount of glare and the second amount of glare.

19. The non-transitory computer-readable medium, according to claim 18, wherein the internal light source is used in connection with a flash for the camera.

20. The non-transitory computer-readable medium, according to claim 14, wherein executable code that prompts the user provides an image to the user indicating a preview of the snapshot that includes indications of glare spots.

21. The non-transitory computer-readable medium, according to claim 20, wherein the preview indicates effects on the glare spots as the user adjusts the position of the camera.

22. The non-transitory computer-readable medium, according to claim 14, wherein executable code that assesses glare uses a camera preview mode to provide a video image that continuously shows snapshots that would be taken by the camera.

23. The non-transitory computer-readable medium, according to claim 14, wherein the snapshot is taken automatically when the amount of glare is below the predetermined threshold.

24. The non-transitory computer-readable medium, according to claim 14, wherein, in response to adjusting the position of the camera failing to lower the amount of glare below the predetermined threshold, the user is prompted to move the document.

25. The non-transitory computer-readable medium, according to claim 14, further comprising:
    executable code that takes the snapshot in response to the amount of glare being above the predetermined threshold and the location of the glare corresponding to portions of the document containing relatively less content than other portions of the document.

26. The non-transitory computer-readable medium, according to claim 14, wherein the camera is provided in a smartphone.

* * * * *